(12) United States Patent
Gauba et al.

(10) Patent No.: US 9,072,002 B1
(45) Date of Patent: Jun. 30, 2015

(54) METHOD AND APPARATUS FOR MONITORING ANTENNA DETERIORATION

(71) Applicant: Sprint Spectrum L.P., Overland Park, KS (US)

(72) Inventors: Maneesh Gauba, Overland Park, KS (US); Steven R. Bales, Lee's Summit, MO (US); Sreekar Marupaduga, Overland Park, KS (US); Andrew M. Wurtenberger, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/076,005

(22) Filed: Nov. 8, 2013

(51) Int. Cl.
*H04W 24/00* (2009.01)
*H04W 24/10* (2009.01)

(52) U.S. Cl.
CPC ...................................... *H04W 24/10* (2013.01)

(58) Field of Classification Search
CPC ............... H04L 2025/03426; H04L 25/03019; H04L 27/186; H04L 5/0048; H04B 7/10; H04B 7/0617; H04B 7/086; H04B 7/04; H04B 7/0408; H04B 7/0491; H04W 16/14; H04W 16/28
USPC ......................................................... 455/424
See application file for complete search history.

(56) References Cited

U.S. PATENT DOCUMENTS

| 6,594,508 | B1 | 7/2003 | Ketonen | |
|---|---|---|---|---|
| 2004/0203466 | A1* | 10/2004 | Kiukkonen et al. | 455/67.14 |
| 2009/0149173 | A1* | 6/2009 | Tolaio | 455/424 |

* cited by examiner

*Primary Examiner* — Kwasi Karikari

(57) ABSTRACT

Disclosed is a method and system for monitoring antenna deterioration. When a signal is transmitted by a base station antenna at a tower-top of a cellular base station, a measurement antenna positioned at the tower-top receives the signal. The signal is measured to determine the signal power and the actual gain of the base station antenna is determined by comparing the determined signal power to the input power of the signal before it was transmitted by the base station antenna.

17 Claims, 13 Drawing Sheets

METHOD AND APPARATUS FOR MONITORING ANTENNA DETERIORATION

BACKGROUND

Unless otherwise indicated herein, the materials described in this section are not prior art to the claims and are not admitted to be prior art by inclusion in this section.

A typical cellular wireless network includes a number of cellular base stations that radiate to define wireless coverage areas, such as cells and cell sectors, in which wireless communication devices (WCDs) (also known as user equipment devices (UEs)), such as cell phones, tablet computers, tracking devices, embedded wireless modules, and other wirelessly equipped communication devices, can operate. In turn, each cellular base station may be coupled with network infrastructure that provides connectivity with one or more transport networks, such as the public switched telephone network (PSTN) and/or the Internet for instance. To facilitate this, each cellular base station may have one or more base station antennas that radiate to provide wireless coverage to WCDs.

To provide wireless coverage, base stations are often arranged in a typical configuration in which one or more base station antennas are positioned outdoors at a tower-top. These base station antennas are connected to base station receivers and transmitters. This arrangement of base station antennas, receivers, and transmitters allows the base station to communicate with WCDs within the coverage area of the base station. When, for example, a base station transmitter provides a signal to a base station antenna, the base station antenna radiates that signal over its coverage area. This signal may be received by one or more WCDs within the coverage area. Similarly, WCDs within the coverage area may transmit a signal that is received by the base station via the base station antenna and receiver.

Each base station antenna has an expected radiation pattern that is based on the design characteristics of the antenna. Base stations usually have directional antennas that are designed to radiate energy in a particular direction; this direction is known as the forward direction. Due to their directional design, directional antennas exhibit peak gain in the forward direction.

Base stations often use a particular type of directional antenna known as sector antenna. Sector antennas are designed to have a fan-shaped radiation pattern covering, for example, 60°, 90°, or 120° of arc in the horizontal (or azimuth) plane and a narrow pattern in the vertical (or elevation) plane. The sector, or main beam, of the antenna (e.g. 60°, 90°, or 120°) is usually defined by the −3 dB beam width in the azimuth plane, where the beam width is measured relative to the peak gain. Sector antennas have significant signal strength (or gain) within their sector and exhibit diminishing signal strength at angles further from the forward direction.

To provide continuous wireless coverage in multiple directions away from the base station, multiple base station antennas are often laid out in an antenna array. To provide 360° coverage in the horizontal plane, a base station may have multiple sector antennas spaced around the circumference of a tower-top. Or, a base station may have base station antennas arranged in an array to provide wireless coverage in particular directions.

Base stations are often deployed repeatedly over a wide geographical area such that each base station, or cell, covers a certain geographical area, or cell sector, until the wide geographical area is covered by cell sectors. Since a wireless coverage area may consist of many base stations each having an array of antennas, the number of individual base station antennas within a coverage area can be very extensive.

OVERVIEW

One significant component of base station upkeep is maintaining base station antennas. Since the base station antennas are often positioned outdoors, at a tower-top, they are exposed to the elements. To protect the antenna, base station antennas are often housed within a radome. However, over time, weather and other forces can compromise the radome and cause deterioration in performance of the base station antenna. For example, a base station antenna can suffer corrosion from moisture, fatigue due to temperature changes, and damage from wind, hail, and lighting strikes. After suffering damage, base station antennas often fail to exhibit the expected gain of a new antenna and must be replaced so that the base station continues to provide adequate wireless coverage.

Engineers charged with base station maintenance often struggle to identify base station antennas that have suffered significant performance degradation. Forces affecting antenna performance often do not impact each base station antenna uniformly, so some base station antennas in the field may still function acceptably while other antennas may have deteriorated past an acceptable threshold. Therefore, engineers must identify a particular base station antenna, or array of antennas, that has suffered performance degradation.

At the same time, inspection of a base station and its antennas is often time consuming and costly. Individual base stations may be located far from the engineer charged with replacing faulty antennas. Moreover, since base station antennas are typically positioned on tower-tops, inspection of antennas can also be dangerous. In addition, because multiple base stations are often deployed to provide continuous coverage over a wide coverage area, the challenges associated with identifying faulty antennas are correspondingly multiplied. Therefore, an improved, cost-effective mechanism for measuring base station antenna gain is needed.

Disclosed herein is a method and corresponding apparatus for using a supplemental antenna to measure the gain of a base station antenna. This method is particularly useful when physical access to the tower-top of a base station is especially difficult, such as when the base station is located in a remote area or at a significant height. However, the disclosed method and apparatus can apply in other scenarios as well. For example, this method may assist an engineer in maintaining multiple base stations.

Accordingly, in one respect, disclosed is a method involving a measurement antenna positioned at a cellular base station tower-top. The measurement antenna may receive an output signal that is wirelessly transmitted from a base station antenna. The base station antenna may be configured to transmit with a radiation pattern having a main lobe region that includes a main beam region and a lateral region. The measurement antenna may be further located at a measurement position inside of the lateral region. In addition, the output signal may represent an input signal having an input signal power that was received for transmission by the base station antenna. The method may further involve measuring the received output signal to determine an output signal power, and determining an actual gain of the base station antenna by comparing the determined output signal power to the input signal power.

In another respect, disclosed is a method involving a measurement antenna and a base station antenna each positioned at a tower-top of a cellular base station. The base station antenna may be configured to transmit with a radiation pattern that defines a main lobe region including a main beam region and a lateral region. The measurement antenna may be further located at a measurement position within the lateral region. In accordance with the method, the base station antenna receives, for transmission, an input signal having an input signal power. The base station antenna wirelessly transmits an output signal representing the received input signal. The measurement antenna receives the output signal transmitted by the base station antenna. The method may further involve measuring the received output signal to determine an output signal power; and determining an actual gain of the base station antenna by comparing the determined output signal power to the input signal power.

And still in another respect, disclosed is an apparatus that measures gain of a base station antenna. The apparatus may include a measurement antenna and a measurement module. The measurement antenna may be positioned at a tower-top of a cellular base station and be arranged to receive, from a base station antenna at the tower-top, an output signal wirelessly transmitted from the base station antenna. The output signal may represent an input signal having an input signal power that the base station antenna received for transmission. The base station antenna may be configured to transmit with a radiation pattern that defines a main lobe region including a main beam region and a lateral region. The measurement antenna may be further located at a measurement position within the lateral region. The measurement module may be configured to perform functions, including, for instance, measuring the received output signal to determine an output signal power at the measurement antenna, and determining the actual gain of the base station antenna at the measurement position by comparing the determined output signal power to the input signal power.

These as well as other aspects, advantages, and alternatives will become apparent to those of ordinary skill in the art by reading the following detailed description, with reference where appropriate to the accompanying drawings. Further, it should be understood that the description provided in this overview and elsewhere in this document is provided by way of example only.

DETAILED DESCRIPTION

As noted above, FIG. 1 is a simplified representation of a base station in which an exemplary embodiment of the present method and apparatus can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location.

Figure 1:
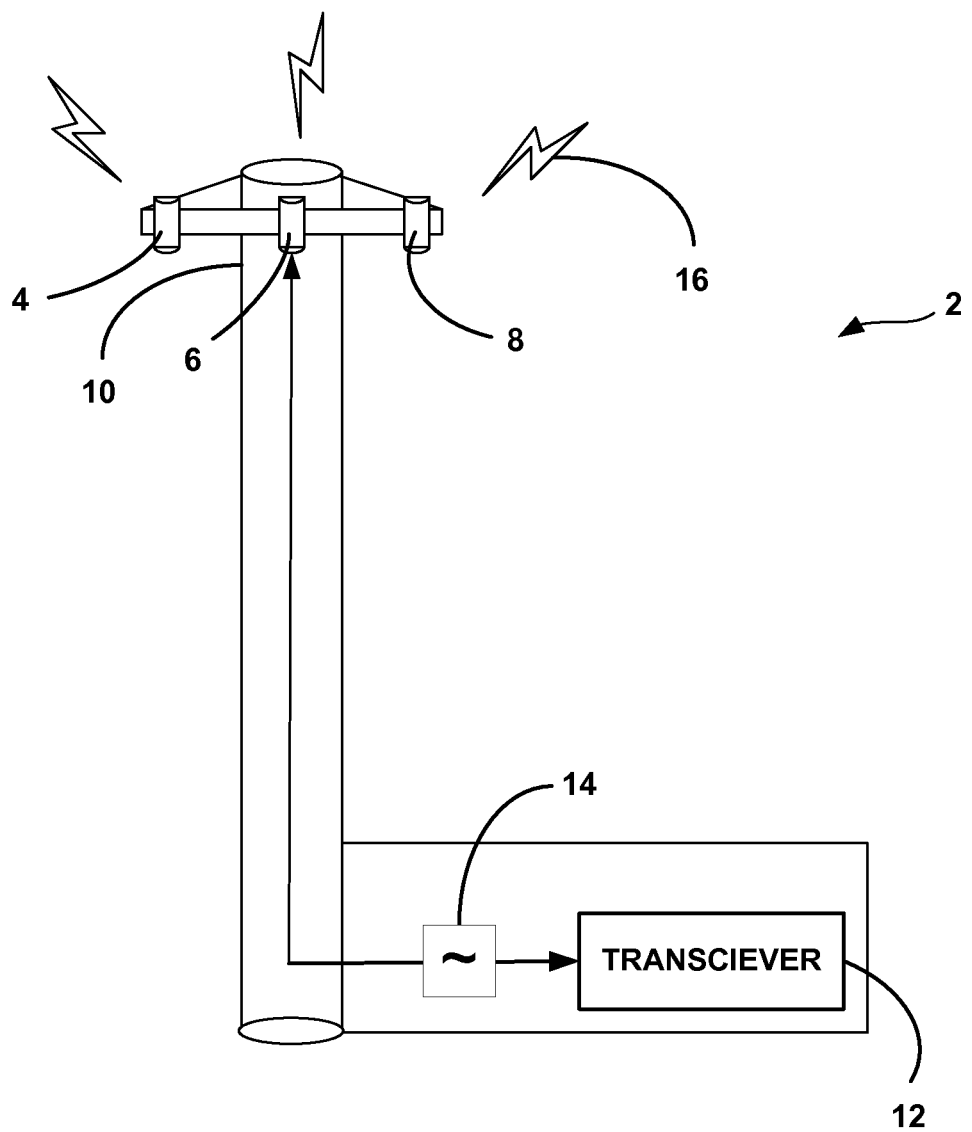
FIG. 1 is a simplified representation of a base station in which an exemplary embodiment of the present method and apparatus can be implemented.

The arrangement of FIG. 1 includes by way of example a representative base station 2 that may function to radiate to provide air interface coverage to WCDs and connectivity with one or more transport networks such as the PSTN and the Internet.

The base station 2 is arranged in the typical configuration in which one or more base station antennas 4, 6, and 8 are placed outdoors at a tower-top 10. To provide wireless coverage in multiple directions away from the base station tower, the one or more base station antennas 4, 6, and 8 may be optionally positioned into an array as shown.

One or more base station receivers and transmitters may be connected to the one or more base station antennas 4, 6, and 8. A base station receiver and transmitter may be combined into one apparatus known as a base station transceiver 12. This arrangement of base station antennas 4, 6, and 8 combined with base station transceiver 12 allows the base station 2 to communicate with WCDs within the coverage area of base station 2. For example, when the base station transceiver 12 provides a signal 14 to a base station antenna 4, the base station antenna 4 radiates an output signal 16 over its coverage area. The output signal 16 may be received by one or more WCDs within the coverage area. Likewise, WCDs within the coverage area may transmit a signal that is received by the base station 2 via a base station antenna 4, 6, or 8 and base station transceiver 12.

Each of base station antennas 4, 6, and 8 may be a directional antenna that has an expected radiation pattern in which transmitted signals are radiated primarily in the forward direction. Moreover, in some embodiments, each of base station antennas 4, 6, and 8 may be a specific type of directional antenna known as a sector antenna. As sector antennas, base station antennas 4, 6, and 8 have fan-shaped radiation patterns covering a wide arc in the azimuth plane and a narrow arc in the elevation plane.

The radiation patterns define a main lobe including as sub-regions both a main beam region and a lateral region. The main beam region is the region of the radiation pattern that comprises the main beam of the antenna. The main beam region of a sector antenna is defined by the half-power (−3 dB) beam widths to either side of the forward direction. In some embodiments, the lateral region is the region within the main lobe but outside of the main beam region. In other embodiments, the lateral region is further defined by various beam widths.

In further embodiments, the base station antenna may be configured to transmit with a radiation pattern having an expected gain in a plurality of directions. The expected gain in the plurality of directions may depend upon the design characteristics of the antenna. For example, a sector antenna may have expected 18 dBi gain in the forward direction and less expected gain in directions at angles further from the forward direction.

Each of base station antennas 4, 6, and 8 may be enclosed within a radome. A radome is a structural, weather-resistant enclosure that protects an antenna. A radome is typically constructed of material that minimally attenuates electromagnetic signals transmitted or received by the antenna; typically fiberglass.

Figure 2:
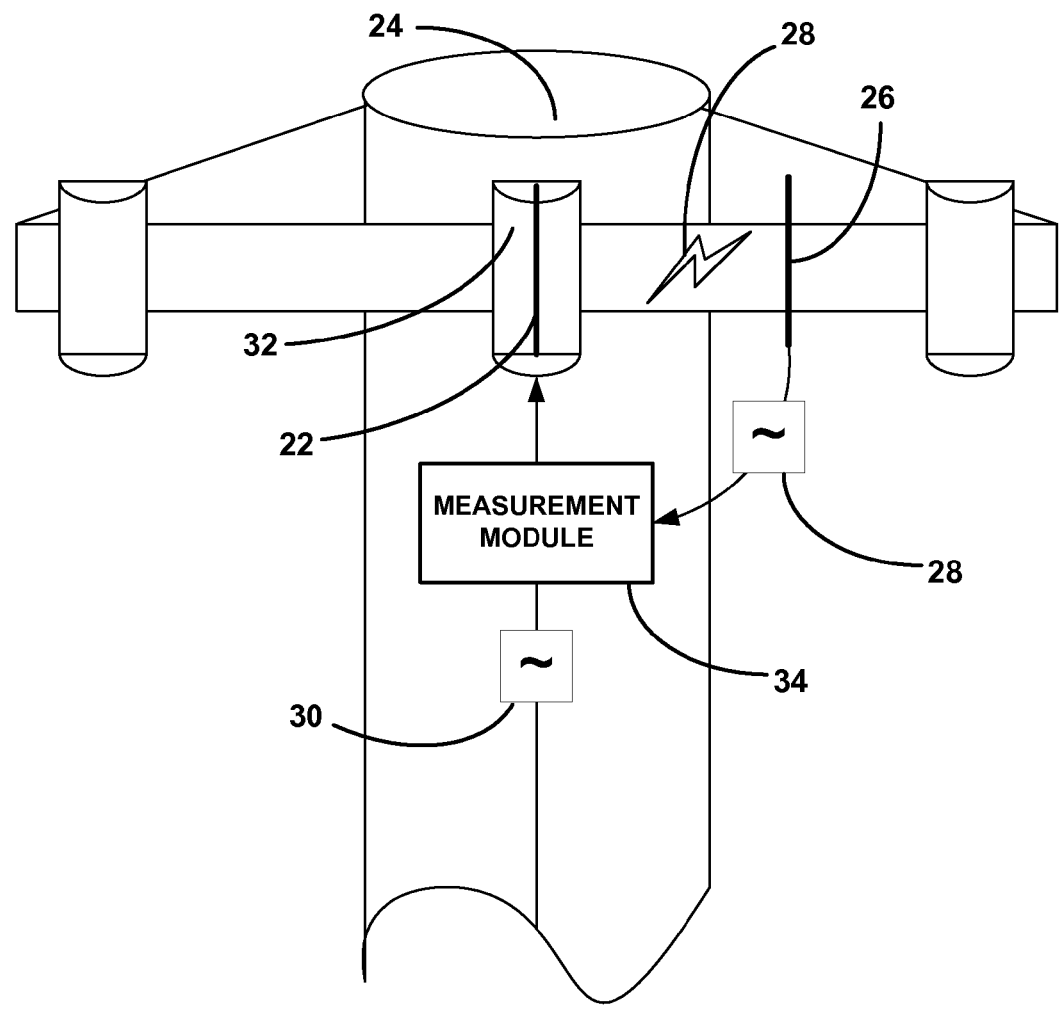
FIG. 2 is a simplified representation of a base station tower-top having a exemplary embodiment of the present apparatus positioned thereon.

FIG. 2 is a simplified representation of a base station tower-top having an exemplary embodiment of the present apparatus positioned thereon. The exemplary embodiment includes measurement antenna 26 and measurement module 34. As an example, a base station antenna 22 is positioned at a tower-top 24 of a cellular base station. The base station antenna 22 is further positioned within a radome 32. The output signal 28 represents an input signal 30 that has a certain input signal power. In some embodiments, the input signal 30 may be a signal generated by the base station in providing wireless coverage to WCDs. In other embodiments, the input signal 30 may be a test signal with predetermined characteristics.

The measurement antenna 26 is arranged to receive wirelessly transmitted signals from base station antennas. In the present example, the measurement antenna 26 is arranged to receive an output signal 28 that is wirelessly transmitted by the base station antenna 22. The measurement antenna 26 may receive signals transmitted by other antennas as well.

In some embodiments, the measurement antenna 26 may be a dipole antenna. A dipole antenna may be selected for its relative simplicity and low cost. However, other types of antennas are possible and are contemplated herein.

In some embodiments, the measurement antenna 26, like the base station antenna 22, is physically positioned at the tower-top of the cellular base station 24. This positioning is intended to arrange the measurement antenna 26 to receive wirelessly transmitted signals from one or more base station antennas, such as base station antenna 22. In addition, this positioning may expose the measurement antenna 26 to similar environmental forces as base station antenna 22. Moreover, positioning the measurement antenna 26 at the tower-top of the cellular base station 24 may permit more convenient maintenance of the measurement antenna 26.

The positioning of a measurement antenna may vary in accordance with the positioning of the one or more base station antennas. Therefore, it is contemplated that in some embodiments, the measurement antenna is positioned at an alternative location other than a tower-top. For example, a base station antenna may be positioned on a building exterior, and the measurement antenna may be positioned accordingly on the building exterior proximate to the base station antenna. In other embodiments, relative positioning of the base station antenna to surrounding structures and physical features may dictate that the measurement antenna be positioned proximate to the base station antenna, but on an alternative structure or feature to the structure or feature on which the base station antenna is positioned.

Moreover, though the exemplary embodiment depicted in FIG. 2 shows the measurement antenna 26 outside of the radome 32, in some embodiments, the measurement antenna 26 will be positioned inside the radome 32 surrounding the base station antenna 22. This configuration exposes the measurement antenna 26 to similar environmental forces as base station antenna 22. In addition, this arrangement may lower deployment costs as the base station antenna and radome may be designed and manufactured to facilitate positioning a measurement antenna in such an arrangement.

In addition, the measurement antenna 26 may be located at a measurement position within the base station antenna radiation pattern. The measurement position is a relative location defined with regard to the base station antenna radiation pattern. Locating the measurement antenna 26 at the measurement position is intended to arrange the measurement antenna 26 to receive a wireless signal with appropriate characteristics. For example, the output signal power of the output signal 28 when wirelessly received by the measurement antenna 26 may be within a certain range when the measurement antenna is at the measurement position.

More specifically, the measurement position may be within the lateral region of the base station antenna radiation pattern. Locating the measurement antenna 26 within the lateral region is intended to not obstruct the main beam of the base station antenna 22. If a measurement antenna were to obstruct the main beam, the measurement antenna may cause dead spots in the wireless coverage area of the base station. In such dead spots, WCDs may have difficulty communicating with the base station. At the same time, the base station antenna 22 is intended to have sufficient gain in the lateral region that output signal 30 has adequate signal strength when received by measurement antenna 26.

In addition, certain radiation patterns may suggest that the measurement antenna should be physically positioned to a side, to the top or bottom, or in a different relative physical direction to the base station antenna. For example, where the base station antenna has a radiation pattern with a wide vertical beam width (e.g. greater than) 6.5°, the measurement antenna may be placed to either side of the base station antenna. Or, for a base station antenna having a radiation pattern having a wide horizontal beam width (e.g. greater than 90°), the measurement antenna may be placed to either the top or bottom of the base station antenna. Such arrangements may allow for more convenient physical positioning of the measurement antenna as the measurement antenna may be placed in closer physical proximity to the base station antenna without having the measurement antenna intersect the main beam of the base station antenna. However, varying the relative physical positioning of the measurement antenna and the base station antenna may permit a measurement antenna to be placed to the top or bottom of a base station antenna having a wide vertical beam width. Similarly, varying the relative physical positioning of the measurement antenna and the base station antenna may permit a measurement antenna to be placed to the side of a base station antenna having a wide horizontal beam width.

In some embodiments, multiple measurement antennas may be present. Multiple measurement antennas may assist in receiving an output signal having adequate signal strength for measurement. Further, in some embodiments, having multiple measurement antennas may assist with receiving output signals from multiple base station antennas present at the tower-top of a base station. Other benefits to the presence of multiple measurement antennas are possible as well.

As described above, the exemplary embodiment includes measurement module 34 in addition to measurement antenna 26. The measurement module 34 is connected to the measurement antenna 26 so that a signal received by the measurement antenna may propagate to the measurement module 34. For example, output signal 28 received by measurement antenna 26 may propagate to measurement module 34.

In some embodiments, the measurement module may be configured to measure the received output signal to determine an output signal power at the measurement antenna. For example, measurement module 34 may be configured to measure the received output signal 28 to determine an output signal power at the measurement antenna 26. In some embodiments, the measurement module 34 may include a wattmeter or other apparatus that measures the power of a received electromagnetic signal.

In further embodiments, the measurement module 34 may also measure the power of the input signal 30 to provide the input signal power. As an illustration, input signal 30 is shown passing through measurement module 34 so that the input signal power of input signal 30 is measured by measurement module 34 before transmission by base station antenna 22. However, in other embodiments, input signal 30 does not pass through measurement module 34. In such embodiments, the input signal power of input signal 30 may be provided to measurement module 34.

In some embodiments, the measurement module may be configured to determine the actual gain of the base station antenna by comparing the determined output signal power to the input signal power. For example, measurement module 34 may be configured to determine the actual gain of base station antenna 22 by comparing the determined output signal power of output signal 28 to the input signal power of input signal 30. In some embodiments, the measurement module 34 may also include a processing unit that determines the actual gain of the base station antenna. The processing unit may comprise one or more general purpose processors (e.g., microprocessors) and/or one or more special purpose processors (e.g., application specific integrated circuits).

As described above, the base station antenna may be configured to transmit with a radiation pattern having an expected gain in a plurality of directions. The expected gain in a plurality of directions may include an expected gain at the measurement position at which the measurement antenna is located. The measurement module may be further configured to determine a difference between the determined actual gain of the base station antenna and the expected gain at the measurement position. This difference may be determined by the processing unit of the measurement module.

In yet further embodiments, the measurement module may be configured to generate, in response to the determined difference being greater than a predetermined threshold tolerance, an indication that the base station antenna gain is below a tolerable level. For example, measurement module 34 may be configured to determine a difference between the determined actual gain of the base station antenna 22 and the expected gain of the base station antenna 22 at the measurement position at which measurement antenna 26 is positioned. The indication may be a notification that a particular base station antenna or array of antennas should be replaced. In some embodiments, the indication may be sent to the base station. In other embodiments, the indication may be sent over a network to another entity. For example, the indication may be sent to an entity that facilitates notifying an engineer charged with base station maintenance that the base station antenna gain may be below a tolerable level. The tolerable level below which the indication is generated may vary based on the configuration of the base station and its need to provide adequate wireless coverage. For example, in some circumstances, the tolerable level may be 2 dB of deterioration from the expected gain of a new antenna. In other circumstances, the tolerable level may be greater or less deterioration from the expected gain.

Figure 3A:
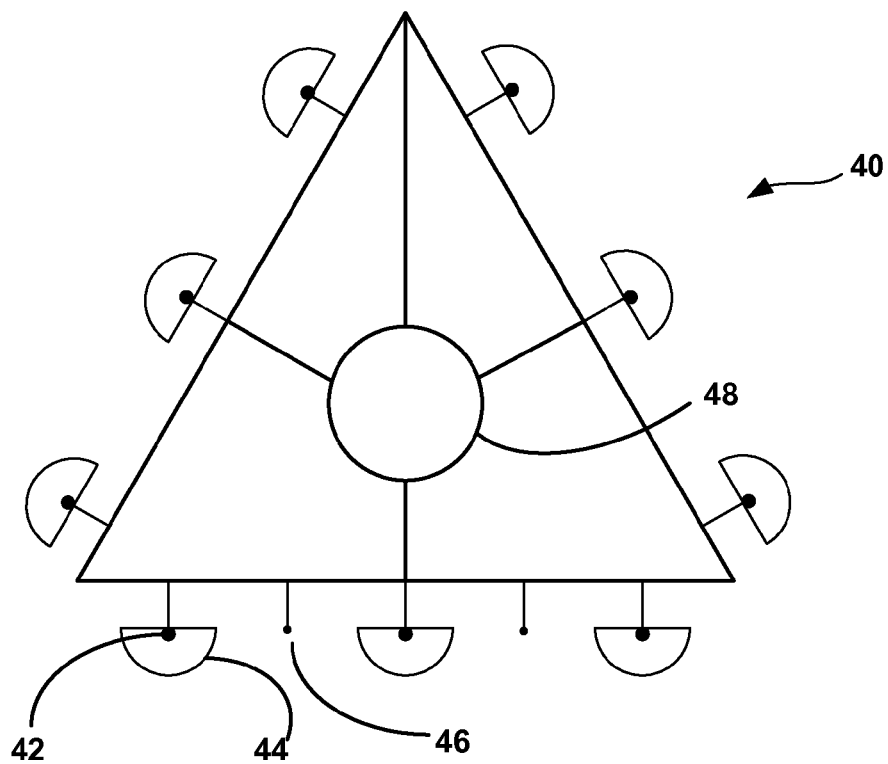
FIG. 3a is a simplified representation showing a top-down view of a base station tower-top.

FIG. 3a is a simplified representation showing a top-down view of a base station tower 40 to illustrate an exemplary relative physical positioning of a measurement antenna to a base station antenna. A base station antenna 42 is provided at a tower-top of a cellular base station 48. The base station antenna 42 is enclosed within a radome 44. In this example, additional base station antennas are also present, as shown.

Figure 3B:
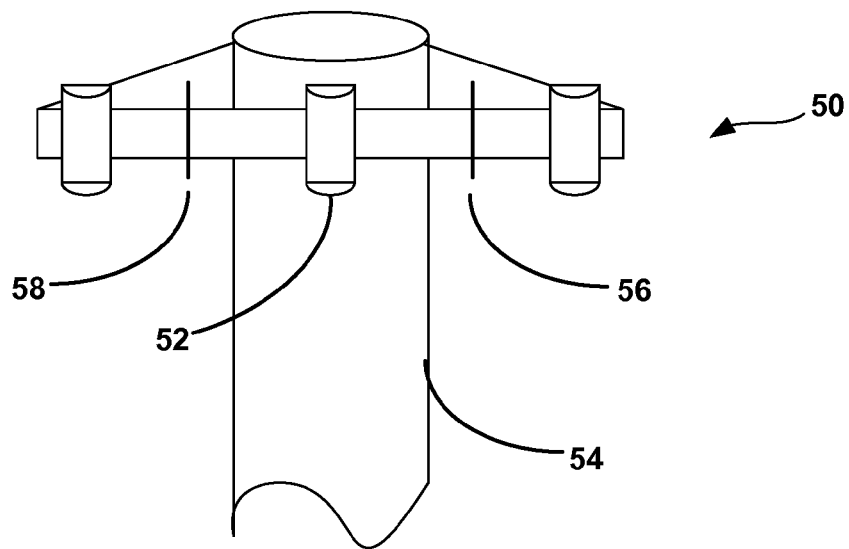
FIG. 3b is a simplified representation showing a side view of a base station tower-top.

Further, measurement antenna 46 is a dipole antenna configured to receive wirelessly transmitted signals from base station antennas, including at least base station antenna 52. Measurement antenna 46 is positioned at the tower-top 48 to the side of the base station antenna 42 to receive output signals transmitted by the base station antenna 42. Further, as described above, in some embodiments additional measurement antennas may be present at the tower-top 48, as shown. As additionally described above, this arrangement is intended to support the reception of output signals having appropriate characteristics from the base station antenna by the measurement antenna when the base station antenna pattern has certain characteristics. More specifically, where the base station antenna has a radiation pattern with a wide vertical beam width (e.g. greater than 6.5°), the measurement antenna may be more conveniently placed to either side of the base station antenna as shown in FIG. 3b. However, as described above, this relative physical positioning of elements is not required.

FIG. 3b is a simplified representation showing a side view of a base station tower 50. In a similar manner as FIG. 3a, a base station antenna 52 is provided at a tower-top of a cellular base station 54. The base station tower 50 may include other base station antennas as shown. Measurement antenna 56 is a dipole antenna configured to receive wirelessly transmitted signals from base station antennas, including at least base station antenna 52. Measurement antenna 56 is positioned at tower-top 54 to one side of base station antenna 52. Similarly, measurement antenna 58 is also a dipole antenna configured to receive wirelessly transmitted signals. It is positioned at tower-top 54 to the other side of the base station antenna 52. Each of measurement antennas 56 and 48 are arranged to receive output signals transmitted by the base station antenna 52. In addition, each of measurement antennas 56 and 58 may also receive output signals transmitted by the other base station antennas.

As described above, this arrangement is intended to support the reception of output signals from the base station antenna by the measurement antenna. In this example, each of measurement antennas 56 and 58 are positioned in the same horizontal plane as the base station antenna 52. This arrangement is not required; however, the fan-shaped radiation pattern often exhibited by base station antennas suggests that the measurement antenna will often be located in or near the same plane as the base station antenna in order to locate the measurement antenna appropriately within the base station antenna radiation pattern.

Figure 4A:
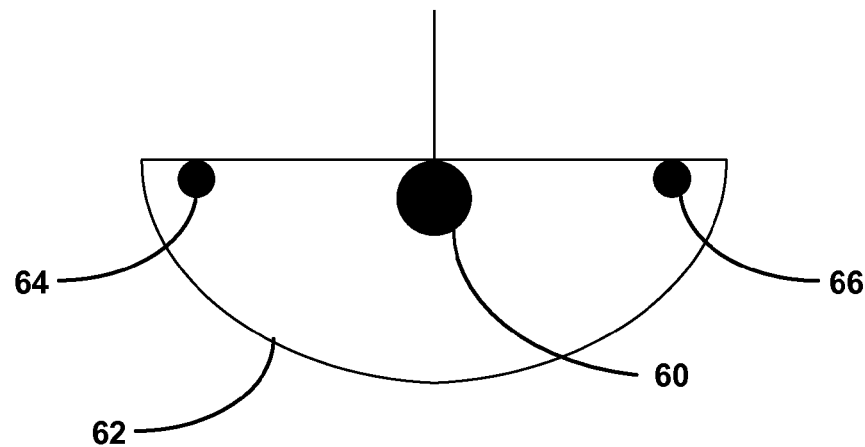
FIG. 4a is a simplified representation showing a top-down view of a base station antenna and radome.
Figure 4B:
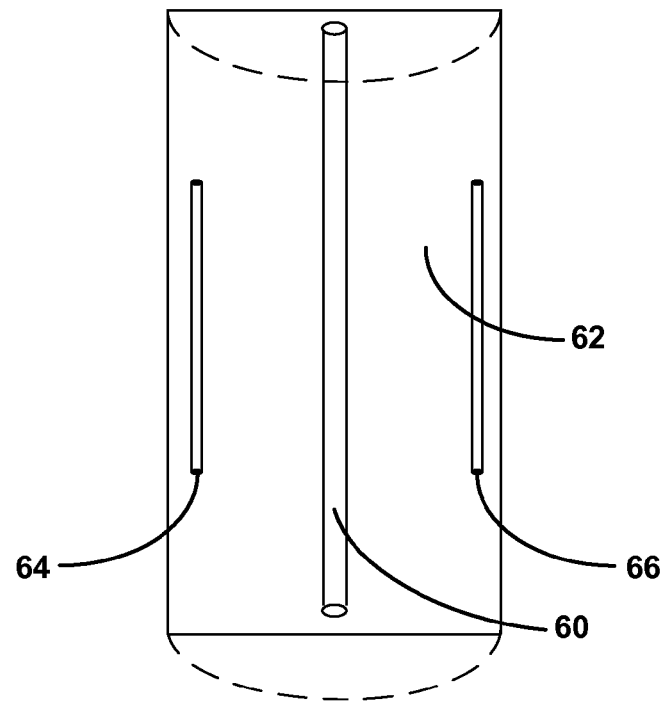
FIG. 4b is a simplified representation showing a side view of the base station antenna and radome.

FIGS. 4a and 4b are simplified representations showing a top-down and a side view of a base station antenna within a radome respectively. In this example, a base station antenna 60 is enclosed by a radome 62. Like measurement antennas 46, 56, and 58 in FIGS. 3a and 3b, measurement antenna 64 is a dipole antenna configured to receive wirelessly transmitted signals from base station antennas, including at least base station antenna 60. Similarly, measurement antenna 66 is also a dipole antenna configured to receive wirelessly transmitted signals from base station antennas, including at least base station antenna 60. Each of measurement antennas 66 and 68 are positioned within the radome 64 to either side of base station antenna 62. This example illustrates a possible arrangement as described above in which one or more measurement antennas are positioned within the radome enclosing the base station antenna. In this arrangement, the measurement antennas 66 and 68 are exposed to the same environmental forces as the base station antenna 62 which may be desired in some embodiments.

FIGS. 4a and 4b depict two measurement antennas 64 and 66 to illustrate possible arrangements of a measurement antenna to either side of base station antenna 60 and within a radome. Some embodiments may include measurement antenna 64 or measurement antenna 66. However, some embodiments may include multiple measurement antennas, such as measurement antennas 64 and 66, for the various benefits described above, or for other benefits not discussed herein.

Figure 4C:
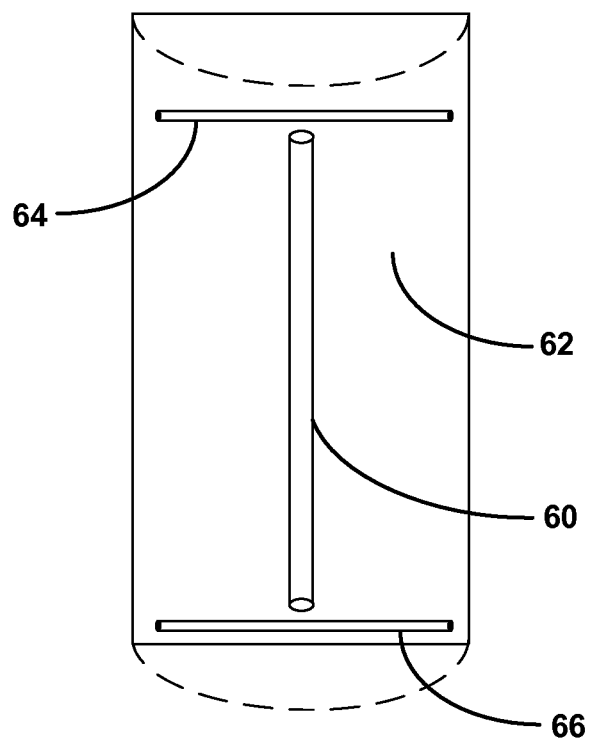
FIG. 4c is an alternate simplified representation showing a side view of the base station antenna and radome.

FIG. 4c is also a simplified representation showing a side view of a base station antenna and radome. Like FIGS. 4a and 4b, base station antenna 60 is enclosed by a radome 62. However, in this example, an alternate arrangement of measurement antennas 64 and 66 is provided. In FIG. 4c, measurement antenna 64 is positioned to the top of base station antenna 60 and measurement antenna 66 is positioned to the bottom of base station antenna 60. As described above, arrangement of measurement antennas to the top or to the bottom of the base station antenna may be more convenient when the base station antenna has a radiation pattern with certain characteristics, such as a wide horizontal beam width (e.g. greater than 90°). To illustrate that example, each of measurement antennas 64 and 66 are positioned to the top and bottom of base station antenna 82 respectively.

Figure 5A:
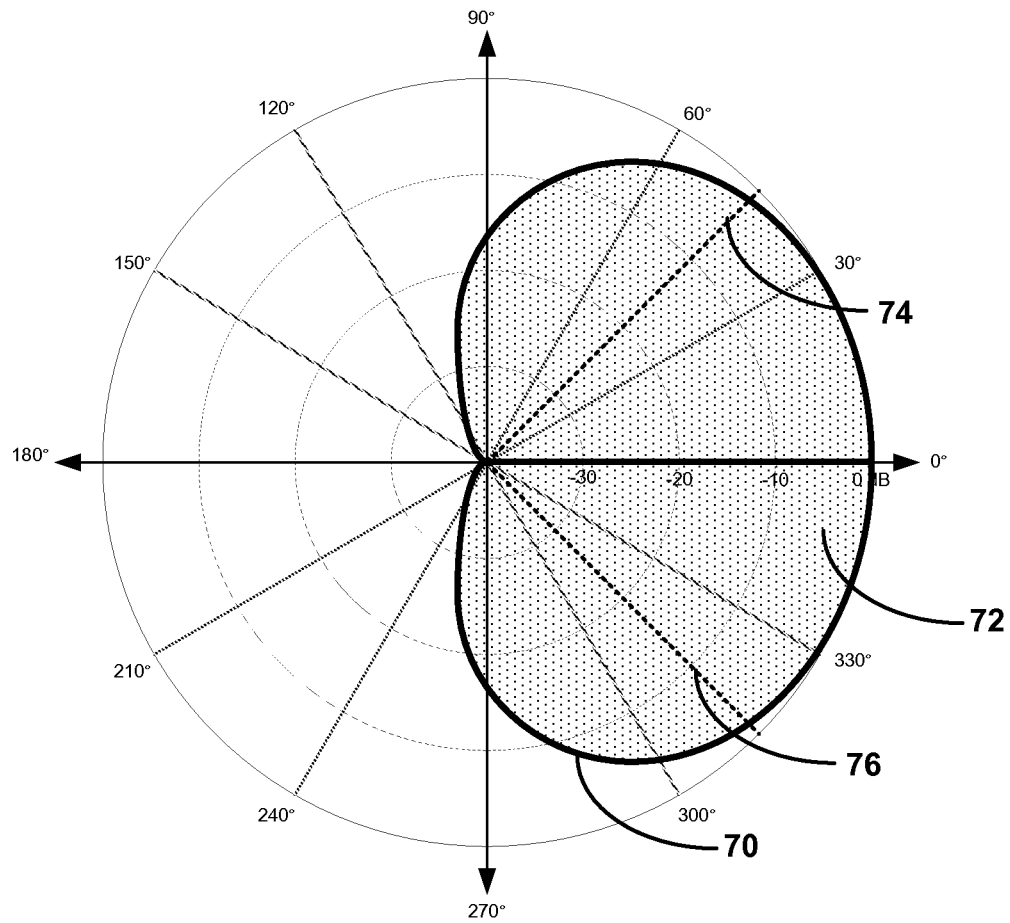
FIG. 5a is a graphical representation of an exemplary base station antenna radiation pattern in the azimuth plane that shows the main lobe of the base station antenna radiation pattern.

As described above, a base station antenna may have an expected radiation pattern based on the design characteristics of the antenna. FIG. 5a is a graphical representation of an exemplary base station antenna radiation pattern 70 in the azimuth plane in which the base station antenna is a sector antenna having a 90° beam width. The forward direction of the sector antenna is at 0° on the graphical representation. As described above, a sector antenna has peak gain in the forward direction and exhibits diminishing gain at angles further from the forward direction. The graphical representation of the radiation pattern 70 shows the main lobe 72 illustrated by the patterned section. Each of half power (−3 dB) beam widths 74 and 76 are 45° from the forward direction thereby defining a 90° sector.

Figure 5B:
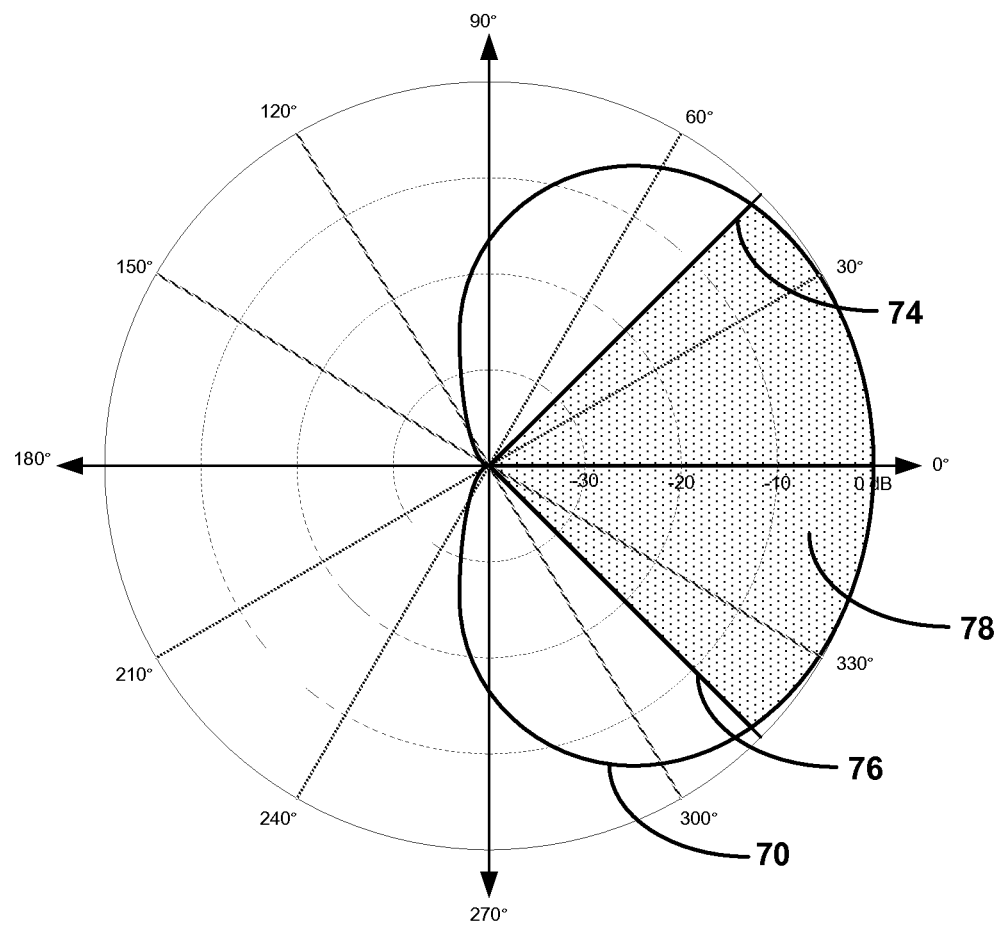
FIG. 5b is a graphical representation of the exemplary base station antenna radiation pattern in the azimuth plane that shows the main beam of the base station antenna radiation pattern.

FIG. 5b is another graphical representation of the exemplary base station antenna radiation pattern 70 in the azimuth plane that shows the main beam region 78 of the base station antenna radiation pattern 70. The main beam region 78 is defined by each of half power (−3 dB) beam widths 74 and 76. In the graphical representation, the main beam region 78 is illustrated by the patterned section.

Figure 5C:
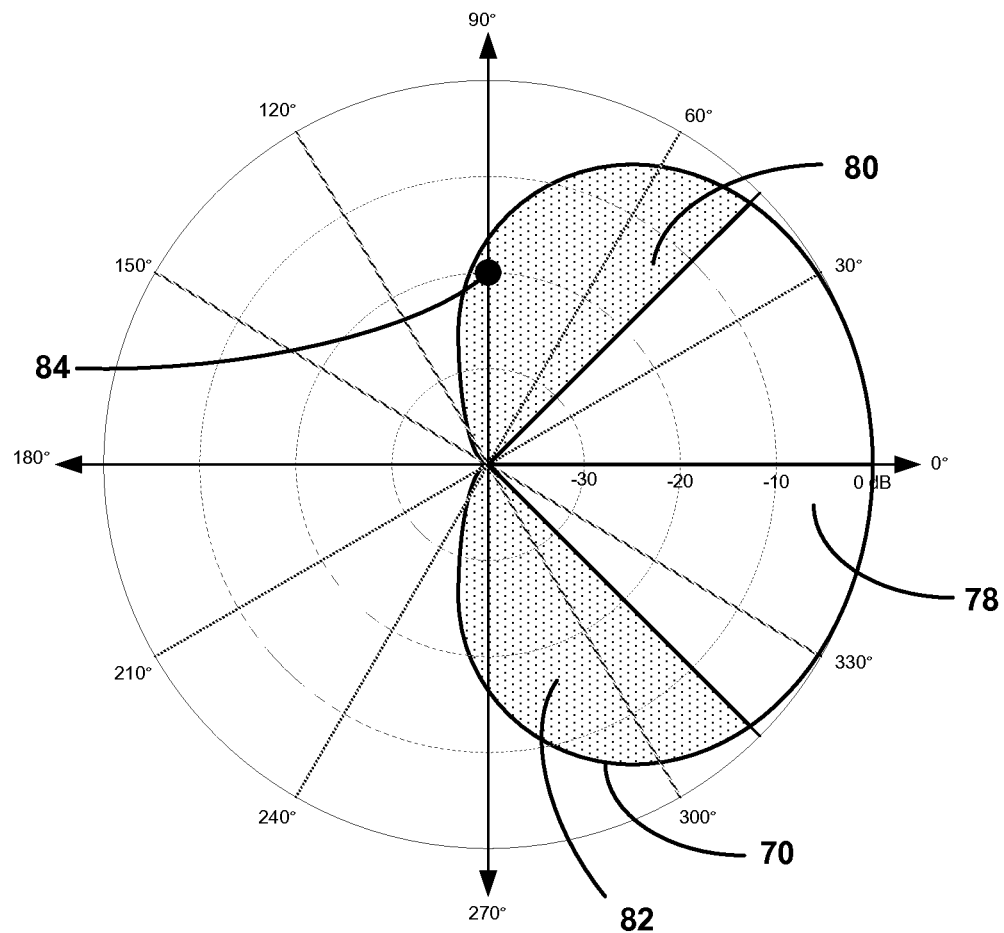
FIG. 5c is a graphical representation of the exemplary base station antenna radiation pattern in the azimuth plane that shows lateral regions of the base station antenna radiation pattern.

FIG. 5c is yet another graphical representation of the exemplary base station antenna radiation pattern 70 in the azimuth plane that shows exemplary lateral regions 80 and 82 of the base station antenna radiation pattern 110. As shown in the graphical representation, each of the lateral regions 80 and 82 is defined by the region within base station antenna radiation pattern 70 but outside of the main beam region 78, wherein the main beam region 78 is defined by the −3 dB beam widths. In some embodiments, a measurement antenna may be located at a measurement position within a lateral region. For example, the measurement antenna may be located at measurement position 84 within lateral region 80. However, the measurement antenna may be located anywhere within lateral region 80 or 82. As described above, locating the measurement antenna within the lateral region is intended to not obstruct the main beam of the base station antenna while still being positioned to receive an output signal from the base station antenna with sufficient signal strength. Obstructing the main beam may have various undesirable consequences, such as causing dead spots in the wireless coverage area of the base station.

Figure 5D:
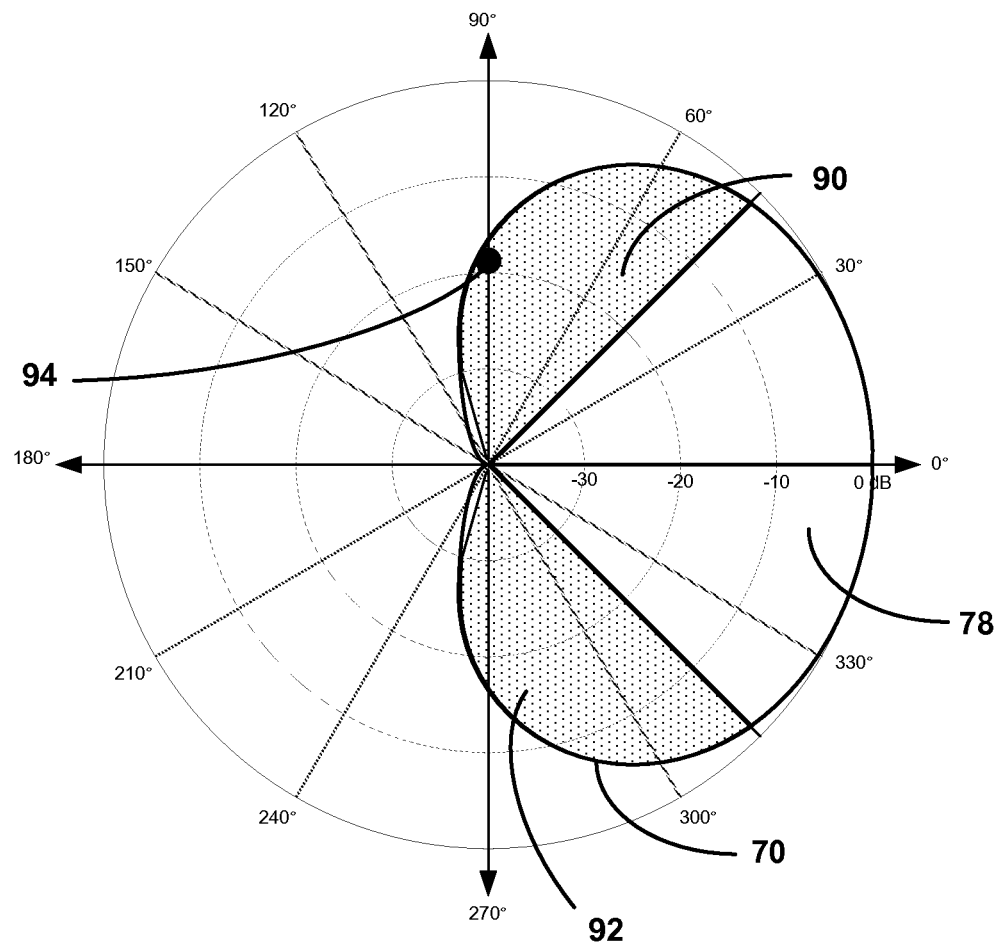
FIG. 5d is a graphical representation of the exemplary base station antenna radiation pattern in the azimuth plane that shows alternate lateral regions of the base station antenna radiation pattern.

FIG. 5d is a further graphical representation of the exemplary base station antenna radiation pattern 70 in the azimuth plane that shows alternative exemplary lateral regions 90 and 92 of the base station antenna radiation pattern 70. As shown in the graphical representation, lateral region 90 is defined by the region extending from the −3 dB beam width to the −30 dB beam width to the side of the forward direction. Similarly, lateral region 92 is defined by the region within radiation pattern 70 extending from the −3 dB beam width to the −30 dB beam width to the other side of the forward direction. In some embodiments, the measurement antenna may be located at measurement position 94 within lateral region 90. However, the measurement antenna may be located anywhere within lateral region 90 or 92.

In some embodiments, positioning the measurement antenna at a measurement position within such a lateral region as lateral regions 90 or 92 may be advantageous. Specifically, measurement positions within such lateral regions may promote receiving output signals having sufficient signal strength. Output signals outside of the −30 dB beam width may have insufficient signal strength to be accurately measured by components of the measurement module. For example, the measurement module may include a wattmeter that does not accurately measure signals having less than −30 dB gain. Such a wattmeter may be chosen for its relative simplicity and low cost as compared to more sensitive wattmeters.

Figure 5E:
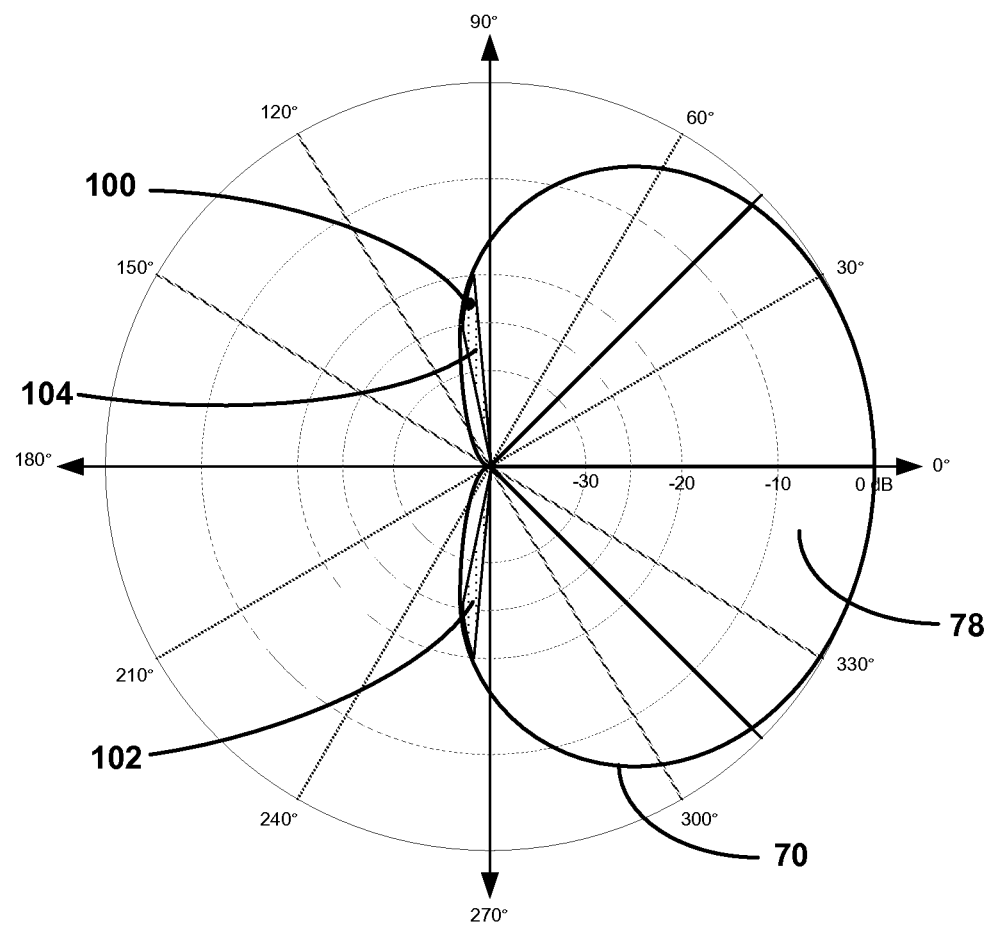
FIG. 5e is a graphical representation of the exemplary base station antenna radiation pattern in the azimuth plane that shows further alternate lateral regions of the base station antenna radiation pattern.

FIG. 5e is a yet further graphical representation of the exemplary base station antenna radiation pattern 70 in the azimuth plane that shows further alternative exemplary lateral regions 100 and 102 of the base station antenna radiation pattern 70. As shown in the graphical representation, lateral region 100 is defined by the region within radiation pattern 130 extending from the −20 dB beam width to the −25 dB beam width to the left of the measurement antenna. Likewise, lateral region 102 is defined by the region within the radiation pattern 70 extending from the −20 dB beam width to the −25 dB beam width to the right of the measurement antenna. In some embodiments, the measurement antenna may be located at measurement position 104 within lateral region 100. However, the measurement antenna may be located anywhere within lateral region 100 or 102.

In some embodiments, positioning the measurement antenna at a measurement position within such a lateral region as lateral regions 100 or 102 may be advantageous. Specifically, measurement positions within such lateral regions may promote receiving output signals having appropriate signal strength. Output signals outside of the −25 dB beam width may have insufficient signal strength to be accurately measured by components of the measurement module. At the same time, output signals outside of the −20 dB beam width may have more than sufficient signal strength such that the signal may overload components of the measurement module. For example, the measurement module may include a wattmeter that accurately measures signals having gain in the range of −20 to −25 dB. Such a wattmeter may be chosen for its relative simplicity and low cost.

Figure 5F:
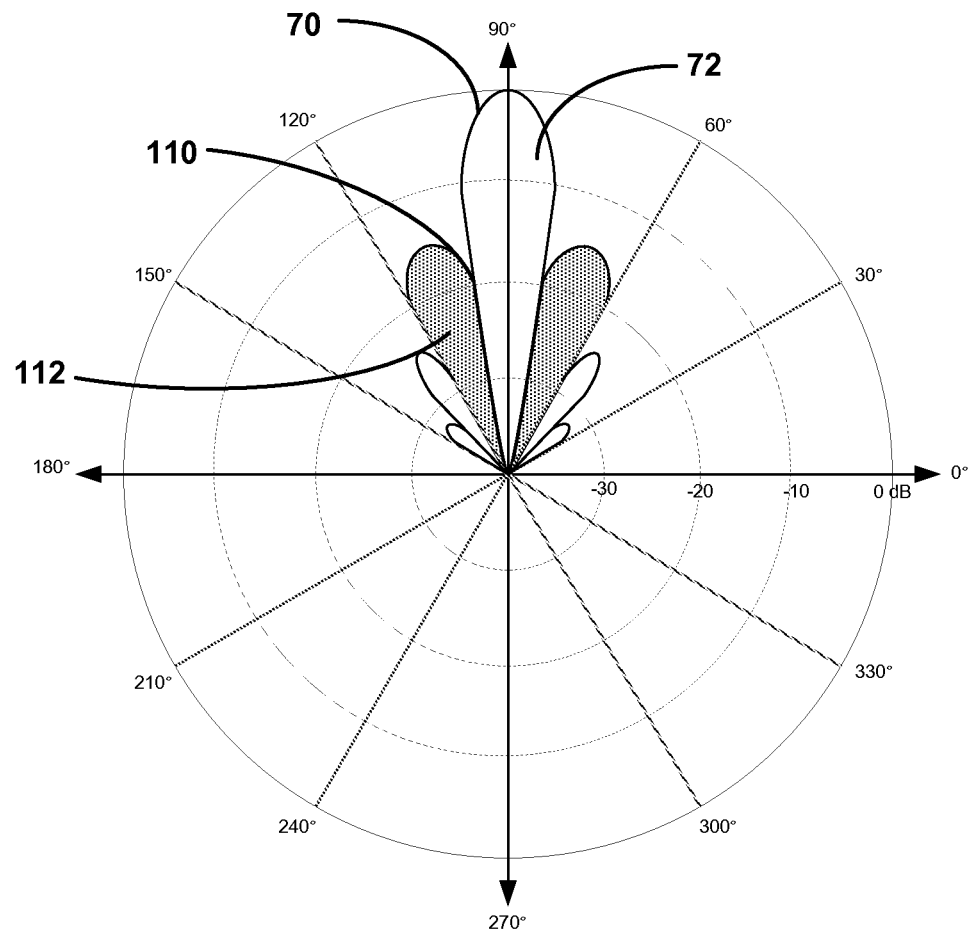
FIG. 5f is a graphical representation of the exemplary base station antenna radiation pattern in the elevation plane that shows a main lobe, a side lobe, and a null region of the base station antenna radiation pattern.

As noted above, FIG. 5f is a graphical representation of the exemplary base station antenna radiation pattern 70 in the elevation plane that shows the main lobe 72, a side lobe 112, and a null region 110 of the base station antenna radiation pattern. As shown in the graphical representation, a base station radiation pattern may have one or more side lobes and one or more null regions between the lobes. Sidelobes and nulls are a byproduct of the design characteristics of a sector antenna in which the sector antenna is configured to have relatively high gain in the azimuth plane and a wide beam width. In some embodiments, the measurement antenna may be located at a measurement position outside of any sidelobes, such as sidelobe 112. Moreover, in further embodiments, the measurement antenna may be located at a measurement position outside of any null regions such as null region 110. Avoiding positioning the measurement antenna within such sidelobes and null regions may promote receiving output signals having appropriate signal strength.

Figure 6:
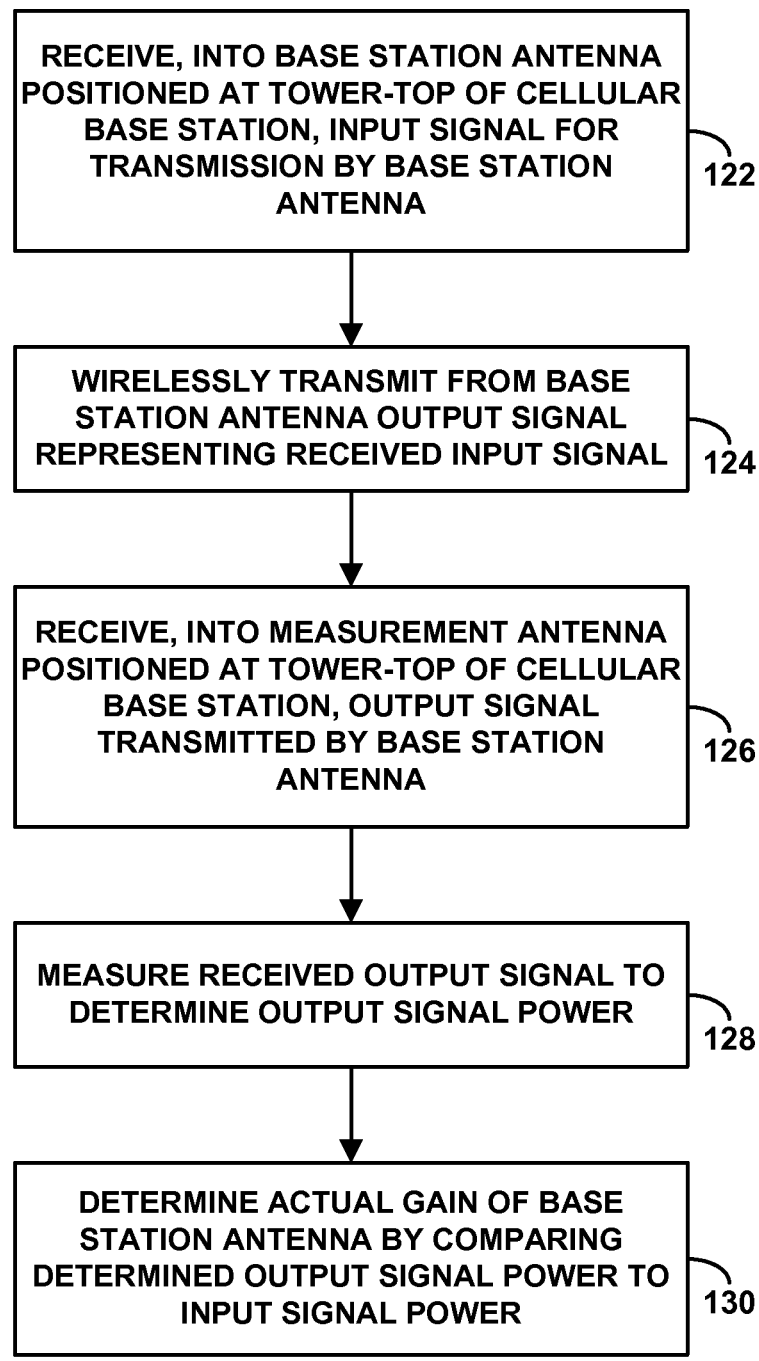
FIG. 6 is a flow chart depicting functions that can be carried out in accordance with an example method.

FIG. 6 is a flow chart depicting a method 120 that can be carried out in accordance with the present disclosure, in a base station 2 such as that depicted in FIG. 2 for instance, and that can be implemented by one or more of the elements as discussed above.

As shown in FIG. 6, at block 122, method 120 involves receiving into a base station antenna positioned at a tower-top of a cellular base station, an input signal for transmission by the base station. The input signal may have a certain input signal power. For example, block 122 may involve base station antenna 22 of FIG. 2 positioned at a tower-top 24 receiving input signal 30 for transmission.

Further, at block 124, method 120 may involve wirelessly transmitting from the base station antenna an output signal representing the receiving input signal. For example, block 124 may involve base station antenna 22 of FIG. 2 wirelessly transmitting output signal 28 that represents input signal 30. The base station antenna may be configured to transmit with a radiation pattern that defines a main lobe region including a main beam region and a lateral region. For example, base station antenna 22 may be configured to transmit with a radiation pattern that defines a main lobe region 72 including a main beam region 78 and a lateral region 80 or 82 as described above and depicted in FIGS. 5a, 5b, and 5c. In other embodiments, the lateral region may be as depicted in FIG. 5d or 5e and as described above.

At block 126, method 120 may further involve receiving, into a measurement antenna positioned at the tower-top of the cellular base station, the output signal transmitted by the base station antenna. For example, block 126 may involve measurement antenna 22 positioned at tower-top 24 of FIG. 2 receiving output signal 28.

The measurement antenna may be located at a measurement position within the lateral region as described above and depicted in FIG. 5c. In other embodiments, the measurement antenna may be located at a measurement position within the lateral region as depicted in FIG. 5d or 5e and described above. In some embodiments, the base station antenna may be enclosed by a radome and the measurement antenna may be located at a measurement position within the radome of the base station antenna. For example, base station antenna 60 of FIGS. 4a-4c may be enclosed by radome 62 and measurement antenna 64 may be located at a measurement position within radome 62.

Further, at block 128, method 120 may involve measuring the received output signal to determine an output signal power. For example, method 120 may involve measurement module 34 of FIG. 2 measuring received output signal 28 to determine an output signal power.

At block 130, method 120 may involve determining an actual gain of the base station antenna by comparing the determined output signal power to the input signal power. For example, block 130 may involve measurement module 34 of FIG. 2 determining the actual gain of base station antenna 22 by comparing the determined output signal power of output signal 28 to the input signal power of input signal 30.

In line with the discussion above, in some embodiments the base station antenna is configured to transmit with a radiation pattern having an expected gain at the measurement position. Method 120 may further involve determining a difference between the determined actual gain and the expected gain at the measurement position. For example, base station antenna 22 may have an expected gain at the measurement position where measurement antenna 26 is positioned. Measurement module 34 may determine the difference between the determined actual gain of base station antenna 22 and the expected gain of base station antenna 22 at the measurement position.

Further in accordance with the discussion above, in some embodiments, method 120 may also involve generating, in response to the determined difference being greater than a predetermined threshold tolerance, an indication that the base station antenna gain is below a tolerable level.

Figure 7:
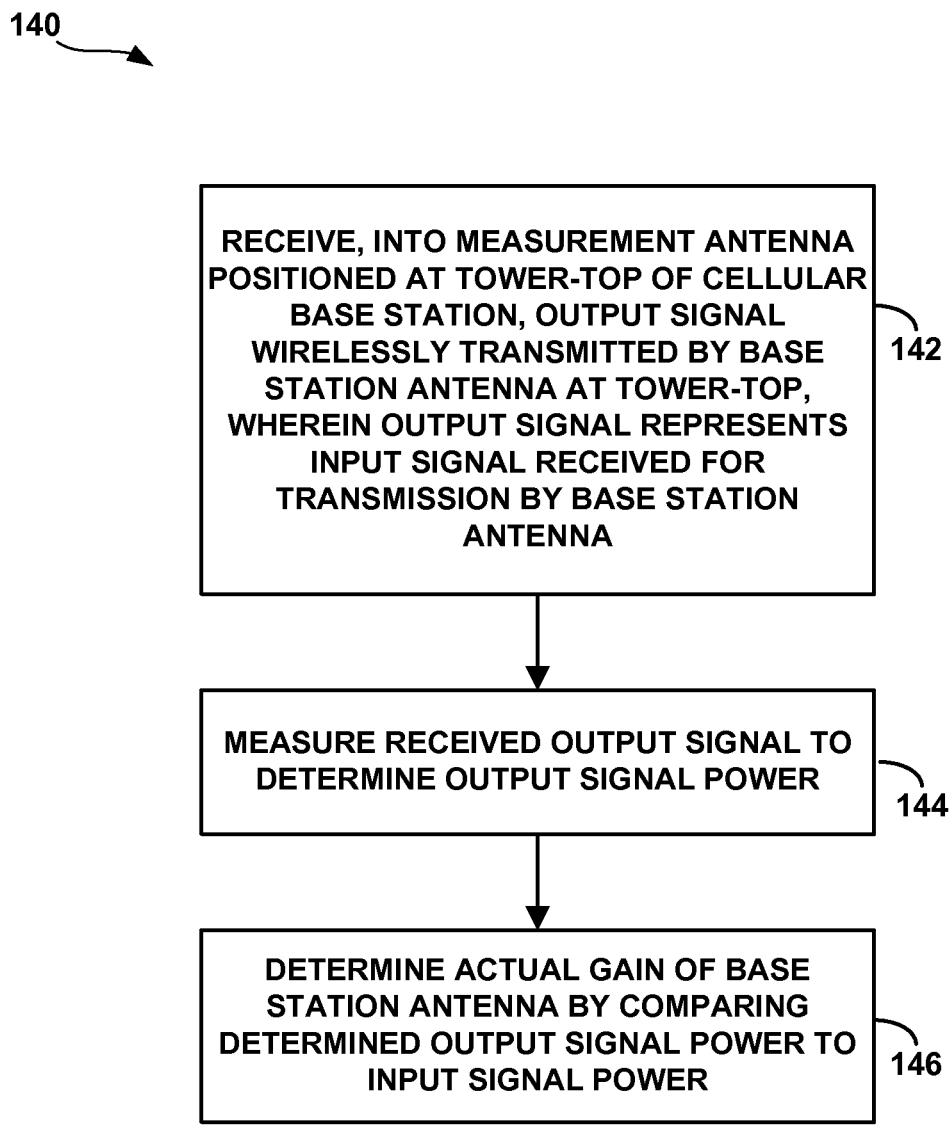
FIG. 7 is another flow chart depicting functions that can be carried out in accordance with an example method.

FIG. 7 is next another flow chart depicting a method 140 that can be carried out in accordance with the present disclosure, in a base station 2 such as that depicted in FIG. 2 for instance, and that can thus be implemented by one or more of the elements as discussed above.

As shown in FIG. 7, at block 142, method 140 involves receiving, into a measurement antenna positioned at a tower-top of a cellular base station, an output signal wirelessly transmitted from a base station antenna at the tower-top. The output signal may represent an input signal received for transmission by the base station antenna, wherein the input signal has an input signal power. The base station antenna may be configured to transmit with a radiation pattern that defines a main lobe region including a main beam region and a lateral region. The measurement antenna may be located at a measurement position within the lateral region.

At block 144, method 140 involves measuring the received output signal to determine an output signal power.

Further, at block 146, method 140 involves determining an actual gain of the base station antenna by comparing the determined output signal power to the input signal power.

In line with the discussion above, in some embodiments, where the base station antenna is configured to transmit with a radiation pattern having an expected gain at the measurement position, method 140 may further involve determining a difference between the determined actual gain and the expected gain at the measurement position. Method 140 may further involve generating, in response to the determined difference being greater than a predetermined threshold tolerance, an indication that the base station antenna gain is below a tolerable level.

Exemplary embodiments have been described above. Those skilled in the art will understand, however, that changes and modifications may be made to these embodiments without departing from the true scope and spirit of the invention.

We claim:

1. A method comprising:
   receiving, into a measurement antenna positioned at a tower-top of a cellular base station, an output signal wirelessly transmitted from a base station antenna at the tower-top, wherein the output signal represents an input signal received for transmission by the base station antenna, wherein the input signal has an input signal power, wherein the base station antenna is configured to transmit with a radiation pattern (a) that has an expected gain at the measurement position and (b) that defines a main lobe region including (i) a main beam region and (ii) a lateral region, and wherein the measurement antenna is located at a measurement position within the lateral region;
   measuring the received output signal to determine an output signal power;
   determining an actual gain of the base station antenna by comparing the determined output signal power to the input signal power;
   determining a difference between the determined actual gain and the expected gain at the measurement position; and
   generating, in response to the determined difference being greater than a predetermined threshold tolerance, an indication that the base station antenna gain is below a tolerable level.

2. The method of claim 1, wherein the main lobe region defines a peak gain, and wherein the main beam region defines a –3 dB beam width relative to the peak gain.

3. The method of claim 1, wherein the main lobe region defines a –30 dB beam width in relation to the peak gain, and wherein the lateral region extends from the –3 dB beam width to the –30 dB beam width.

4. The method of claim 3, wherein the main lobe region defines a –20 dB beam width in relation to the peak gain and a –25 beam width in relation to the peak gain, and wherein the lateral region extends from the –20 dB beam width to the –25 dB beam width.

5. The method of claim 1, wherein a radome encloses the base station antenna, and wherein the measurement position is further located inside the radome.

6. The method of claim 1, wherein the radiation pattern further defines one or more null regions and wherein the measurement position is further located outside of the one or more null regions.

7. The method of claim 1, wherein the radiation pattern further defines one or more side lobe regions and wherein the measurement position is further located outside of the one or more side lobe regions.

8. A method comprising:
   receiving, into a base station antenna positioned at a tower-top of a cellular base station, an input signal for transmission by the base station antenna, the input signal having an input signal power;
   wirelessly transmitting from the base station antenna an output signal representing the received input signal, wherein the base station antenna is configured to transmit with a radiation pattern (a) that has an expected gain at the measurement position and (b) that defines a main lobe region including (i) a main beam region and (ii) a lateral region;
   receiving, into a measurement antenna positioned at the tower-top of the cellular base station, the output signal transmitted by the base station antenna, wherein the measurement antenna is located at a measurement position within the lateral region;
   measuring the received output signal to determine an output signal power;
   determining an actual gain of the base station antenna by comparing the determined output signal power to the input signal power;
   determining a difference between the determined actual gain and the expected gain at the measurement position; and
   generating, in response to the determined difference being greater than a predetermined threshold tolerance, an indication that the base station antenna gain is below a tolerable level.

9. The method of claim 8, wherein the main lobe region defines a peak gain, and wherein the main beam region defines a –3 beam width relative to the peak gain.

10. The method of claim 9, wherein the main lobe region defines a –30 dB beam width in relation to the peak gain, and wherein the lateral region extends from the –3 dB beam width to the –30 beam width.

11. The method of claim 9, wherein the main lobe region defines a –20 dB beam width in relation to the peak gain and a –25 dB beam width in relation to the peak gain, and wherein the lateral region extends from the –20 dB beam width to the –25 dB beam width.

12. The method of claim 8, wherein a radome encloses the base station antenna, and wherein the measurement position is further located inside the radome.

13. An apparatus comprising:
   a measurement antenna positioned at a tower-top of a cellular base station, the measurement antenna being arranged to receive, from a base station antenna at the tower-top, an output signal wirelessly transmitted from the base station antenna, wherein the output signal represents an input signal received for transmission by the base station antenna, wherein the input signal has an input signal power, wherein the base station antenna is configured to transmit with a radiation pattern (a) that has an expected gain at the measurement position and (b) that defines a main lobe region including (i) a main beam region and (ii) a lateral region, and wherein the measurement antenna is located at a measurement position within the lateral region;
   a measurement module connected to the measurement antenna, wherein the measurement module is configured (a) to measure the received output signal to determine an output signal power at the measurement antenna, (b) to determine the actual gain of the base station antenna at the measurement position by comparing the determined output signal power to the input signal power, (c) to determine a difference between the determined actual gain and the expected gain at the measurement position; and (d) to generate, in response to the determined difference being greater than a predetermined threshold tolerance, an indication that the base station antenna gain is below a tolerable level.

14. The apparatus of claim 13, wherein the main lobe region defines a peak gain, and wherein the main beam region defines a –3 dB beam width relative to the peak gain, and wherein the main lobe region defines a –30 dB beam width in relation to the peak gain, and wherein the lateral region extends from the –3 dB beam width to the –30 dB beam width.

15. The apparatus of claim 13, wherein the main lobe region defines a peak gain, and wherein the main beam region defines a −3 dB beam width relative to the peak gain, and wherein the main lobe region defines a −20 dB beam width in relation to the peak gain and a −25 dB beam width in relation to the peak gain, and wherein the lateral region extends from the −20 dB beam width to the −25 dB beam width.

16. The apparatus of claim 13, wherein a radome encloses the base station antenna, and wherein the measurement position is further located inside the radome.

17. The apparatus of claim 13, wherein the measurement antenna comprises a dipole antenna.

* * * * *